United States Patent [19]

Smith

[11] Patent Number: 4,793,597

[45] Date of Patent: Dec. 27, 1988

[54] TAPERED END COMPOSITE SPRING

[75] Inventor: Frank F. Smith, Seattle, Wash.

[73] Assignee: The Paton Corporation, Seattle, Wash.

[21] Appl. No.: 936,433

[22] Filed: Dec. 1, 1986

[51] Int. Cl.$^4$ ............... B60G 11/52; F16F 1/12; F16M 13/00; F16D 1/00

[52] U.S. Cl. ............... 267/33; 248/634; 267/179; 267/288; 267/166.1; 403/220; 403/226

[58] Field of Search ............ 267/20 A, 33, 60, 61 R, 267/61 S, 63 R, 136, 140, 140.4, 152, 153, 166, 167, 169, 170, 179, 231, 240, 259, 286, 287, 258, 257, 288, 252, 259, 166.1, 292; 280/662, 666, 668, 670, 671, 673; 248/560, 565, 634, 638, 615; 24/290; 403/226, 227, 220

[56] References Cited

U.S. PATENT DOCUMENTS

| | | | |
|---|---|---|---|
| 1,665,762 | 4/1928 | Waream | 267/179 X |
| 1,936,389 | 11/1933 | Halquist | 267/33 |
| 2,005,089 | 6/1935 | Krebs | 267/33 |
| 2,230,069 | 1/1941 | Rushmore | 267/33 |
| 2,605,099 | 7/1952 | Brown | 267/33 |
| 2,822,165 | 2/1958 | Boschi | 267/33 |
| 3,037,764 | 6/1962 | Paulsen | 267/63 R |
| 3,118,659 | 1/1964 | Paulsen | 267/33 |
| 3,279,779 | 10/1966 | Thomas et al. | 267/153 |
| 3,447,814 | 6/1969 | Siber et al. | 267/63 R |
| 3,583,693 | 6/1971 | Johnston | 267/153 |
| 3,879,024 | 4/1975 | Scott et al. | 267/140.4 |
| 3,989,293 | 11/1976 | Haberle et al. | 403/226 X |
| 4,200,307 | 4/1980 | Szabo | 280/668 |

FOREIGN PATENT DOCUMENTS

| | | |
|---|---|---|
| 160851 | 4/1954 | Australia . |
| 230754 | 4/1963 | Austria ............... 267/33 |
| 662622 | 7/1938 | Fed. Rep. of Germany . |
| 1440023 | 8/1966 | France . |
| 52-24676 | 2/1977 | Japan . |
| 58-118344 | 7/1983 | Japan ............... 267/152 |
| 755186 | 8/1956 | United Kingdom . |
| 885925 | 1/1962 | United Kingdom ............... 267/33 |
| 1437525 | 5/1976 | United Kingdom . |

OTHER PUBLICATIONS

Rowland, "Suspension Simplicity from Paton," Automotive News, Jul. 28, 1986, at 32.

The Paton Corp., "The Electronic Suspension Revolution and the Paton Dry-Namic TM (Non-Hydraulic) Suspensions," Jun. 1986.

Gieck et al., "The 'Marsh Mellow' Spring," SAE Technical Paper 820,161, Feb. 22, 1982.

Moulton et al., "Rubber Springs for Vehicle Suspension," published by the Institute of Mechanical Engineering, 1956.

Primary Examiner—Andres Kashnikow
Assistant Examiner—Robert J. Oberleitner
Attorney, Agent, or Firm—Finnegan, Henderson, Farabow, Garrett & Dunner

[57] ABSTRACT

Two support assemblies for respectively supporting the tapered end and the cylindrical end of an elongated tubular elastomeric spring between two opposed spring seats are disclosed. The support assembly for the tapered end is made up of an elongated retaining member which is positionable generally transverse to and entirely inside the tapered end. This retaining member includes two inclined portions which bear down upon the inside of the tapered end when pulled in an outward direction by a bolt thredably secured to a convetional spring seat. The support assembly for the cylindrical end is made up of a second retaining member which is positionable generally transverse to and entirely inside the cylindrical end. The second retaining member includes a plurality of expandable flange portions which engage the inside of the cylindrical portion as the retaining member is pulled in an outward direction by a second bolt threadably secured to the second spring seat. The spring is reinforced to resist bulging in response to the outwardly directed forces applied by the support assemblies.

4 Claims, 2 Drawing Sheets

TAPERED END COMPOSITE SPRING

BACKGROUND OF THE INVENTION

This invention relates to elastomeric springs and, more particularly, to tubular, composite springs.

Tubular, composite springs are made up of a tubular elastomeric body and a coil spring embedded in the body to reinforce it against lateral buckling. In many practical applications, it is desirable to mount such springs in locations in which they are subjected to axial compression loads, which may or may not be applied axially. While it is important to secure the ends of the spring to the sprung and unsprung mass associated with the particular application, it is particularly important to be able to maintain positive securement and positioning of the spring ends where bending or twisting forces are applied to the spring on account of such off-axis load.. This is a common requirement in many vehicular applications, since the location and orientation of the spring often are determined by the geometry of the suspension, the location of the shock absorbers and other factors.

In many vehicular applications, a further requirement is that one or both ends of the composite spring be mountable by the same spring seat as that used to mount the ends of a coil spring. This seat typically includes a protruding central portion which projects axially into one end of the coil spring, forming a circular shoulder which engages the inner face of, and positions, the outermost coil. When used with a composite spring, however, this seat tends to be unsatisfactory because the end of the spring, being formed of elastomer, is deformable in the region of contact with the seat. Consequently, external containment or clamping devices must be used to obtain the positive securement and positioning described above. In many practical vehicular applications, however, the suspension geometry does not provide sufficient space adjacent to the spring for such devices.

SUMMARY OF THE INVENTION

This invention overcomes or substantially mitigates these concerns by providing a composite spring made up of a tubular elastomeric body having two reinforced end portions, one of which is tapered and has a generally conical interior surface terminating in a first opening, and the other of which is cylindrical and has a generally cylindrical surface terminating in a second opening larger than the first. The tapered, small end is mountable by a conventional spring seat of the type just described.

This spring may be mounted by two internal support assemblies, a first assembly for supporting the tapered, small end of the spring, and a second support assembly for supporting the cylindrical, large end of the spring. The first, or small end, spring support assembly comprises a first retaining member which has two oppositely inclined flange portions. When the first retaining member is positioned inside of the small end of the spring, adjacent and generally parallel to the plane of the first opening, these flange portions are engagable, respectively, in face-to-face relation with spaced apart portions of the generally conical interior surface of the small end of the spring. The first retaining member further includes an intermediate portion which fronts upon the first opening when the inclined flange portions are so engaged, and means acting between the intermediate portion of the first retaining member and one of the two seats for pulling the first retaining member toward the seat. As the first retaining member is so pulled, it draws the small end down upon, and secures it to, the seat.

The second, or large end, support assembly comprises a second retaining member having two or more parallel flange portions. When the second retaining member is positioned inside of the large end of the spring, adjacent and generally parallel to the face of the second opening, these flange portions are engagable, respectively, in face-to-face relation with spaced apart portions of the generally cylindrical interior surface of the large end of the spring. The second retaining member further includes an intermediate portion which fronts upon the second opening when the parallel flange portions are so engaged, and means acting between the intermediate portion of the second retaining member and the other seat for pulling the second retaining member toward the seat. As the second retaining member is so pulled, these parallel flange portions spread apart, and thus progressively engage, the generally cylindrical interior surface, while simultaneously drawing the large end down upon, and securing it to, the seat. In those practical applications involving a spring having both a small end and a large end, the large end of the spring is secured first by the large end support assembly. Once this is accomplished, the small end is secured.

These and other features, objects and advantages of the present invention will become apparent from the detailed description and claims to follow, taken in conjunction with the accompanying drawings in which like parts bear like reference numerals.

DETAILED DESCRIPTION OF THE DRAWINGS

Figure 1:
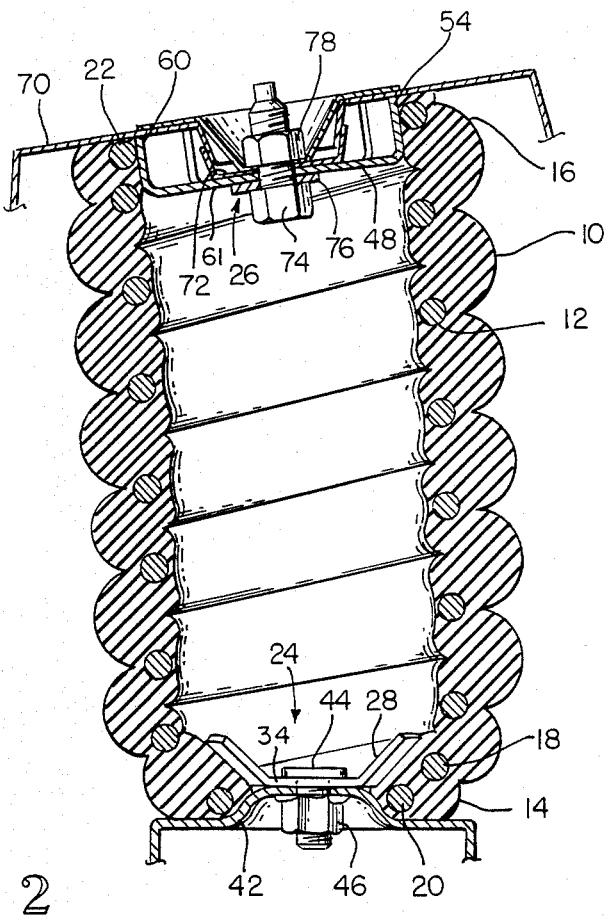
FIG. 1 is a longitudinal section of the tubular composite spring according to the present invention, together with apparatus for mounting it.
Figure 5:
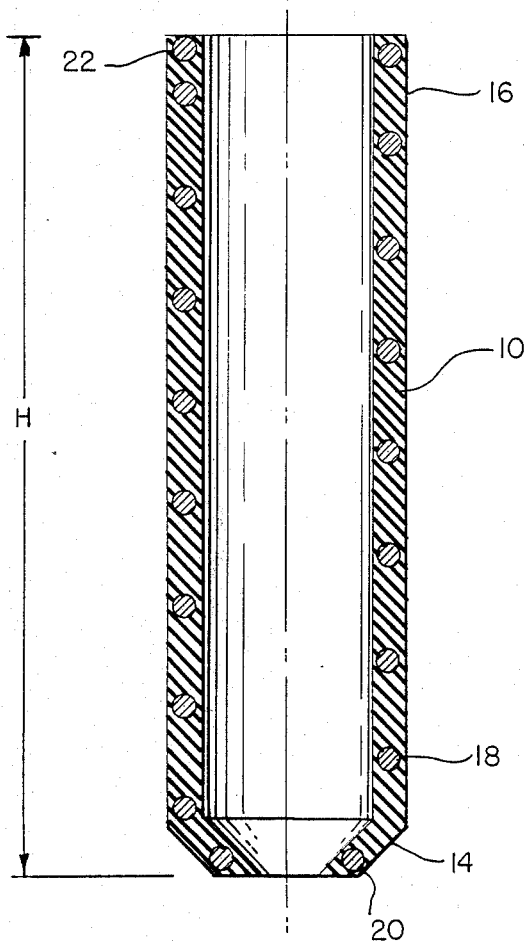
FIG. 5 is a longitudinal section of the FIG. 1 spring in its unloaded condition.

One presently preferred embodiment of the composute spring of the present invention, as illustrated in FIG. 1, is made up of a tubular elastomeric body 10 and a coil spring 12 embedded in the body such that, at the design position illustrated, the body deforms to provide a continuous spiral convolution or "coil" shaped bulge, located between adjacent coils of spring 12. In its unloaded condition, however, body 10 has a generally cylindrical, straight sided profile, as illustrated in FIG. 5. In the example illustrated, one end of the spring (generally referenced by numeral 14) is tapered or "necks down" to a first opening. The other, larger end of the spring terminates in an opening which corresponds in diameter to the interior diameter of the spring. (This large end is generally referenced by numeral 16.) End 14 is reinforced by coils 18 and 20. Likewise, end 16 is reinforced by coil 22. Consequently, both ends 14 and 16 are reinforced by the underlying coils of spring 12 to resist outward bulging forces. The spring illustrated in the drawings has several advantages which arise out of the unique structure of end 14. Among these are: that end 14 permits it to be used with a conventional coil spring mount, as will be described presently, and that it requires less elastomer, and hence is somewaht more economical, than a fully cylindrical composite spring of comparable load bearing capacity and performance.

Figure 6:
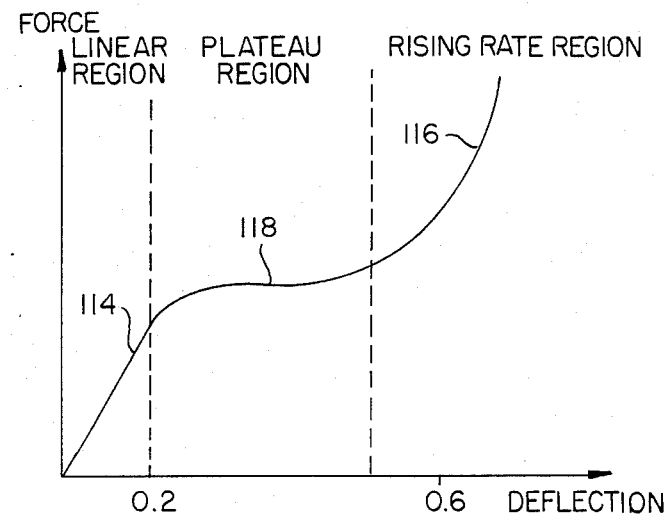
FIG. 6 is the force vs. deflection curve of the FIG. 1 spring.

Spring 12 also controls deformation of body 10 such that the force/deflection curve of the composite spring has two stiff regions, each characterized by essentially stable compression of the body, and an intermediate soft region characterized by unstable but symmetric bulging of the body. Referring to FIG. 6, a typical force/deflection curve of the exemplary composite spring includes a lower stiff region 114 in which stiffness is proportional to the shear modulus of the material forming body 10. In this region, essentially only uniaxial compression of the body occurs, giving rise to a generally constant slope curve approximating a linear spring rate. The force/deflection curve further includes an upper stiff region 116 in which stiffness is proportional to the shear modulus, but also is influenced by other factors, as will be described. In this region the body is under compression but, unlike region 114, the spring rate is of rising rate. In both regions 114 and 116, however, the body is deformed under conditions of essentially stable compression.

This invention stems from the discovery that, by causing instead of preventing instability, an intermediate soft region 118 (FIG. 6) of extended duration may be obtained, provided the instability is controlled so that it is localized and symmetric; that is, so that the body does not undergo columnar or other assymetric buckling. (The terms "symmetric" and "asymmetric" have as a reference the longitudinal axis of the body 10.) This control is accomplished by the coil spring 12. Being embedded in and bonded to the body 10 this spring restrains the cylindrical body wall from bulging along a helical path that coincides with the individual coils of spring 12. The body is free to bulge laterally, however, in the axial spaces between adjacent convolutions of this path 19 (or between the individual coils of spring 12) at the intervals corresponding to the pitch of spring 12. Thus, the composite spring appears as a rubber coil spring, in which each individual "coil" is formed by one of these lateral bulges.

In its undeflected state, the composite spring of this invention has a simple cylindrical wall form that appears rectilinear in longitudinal section, as shown (FIG. 5). As a columnar or axial load is applied to body 10, uniaxial compression occurs until the body has been deflected about twenty percent of its unloaded length H (FIG. 5), or about 0.2 H (FIG. 6). It is at this deflection that local symmetric bulging instability begins to appear in sequence between adjacent coils of spring 12. The force/deflection curve has by now progressed upward along and through region 114 and is entering region 118. As depicted in FIG. 6, as deflection continues beyond about 0.2 H, this symmetric bulging instability appears as lateral outward bulging between adjacent coils of spring 12, first near the middle of body 10, and subsequently between other adjacent coils. As a consequence, the external surface of the composite spring increasingly acquires an undulatory configuration. The duration of region 118 corresponds to the range of deflection during which the symmetric bulging instability grows toward and eventually assumes a continuous coil configuration, as shown (FIG. 1). With continued deflection beyond about 0.6 H, adjacent undulations contact and "bottom out" upon one another, and further growth of the bulging instability essentially ceases. Continued deflection therefore produces further compression of the body along region 116 of the force/deflection curve (FIG. 6) under conditions of uniaxial compression similar to region 114, except that further bottoming of the adjacent undulations produces an increasing effective shape factor and hence a rising instead of linear spring rate.

Still referring to FIG. 1, one presently preferred embodiment of the apparatus for mounting the composite spring of this invention is made up of two internal support assemblies, a small end support assembly (generally referenced by numeral 24) for supporting end 14, and a large end support assembly (generally referenced by numeral 26) for supporting end 16. The small end support assembly includes a retaining member 28 (FIG. 2) having two oppositely inclined flange portions 30 and 32 which are engagable, respectively, in face-to-face relation with two spaced apart portions of the generally conical interior surface of end 14, as shown (FIG. 1). Member 28 further includes an intermediate portion 34 which fronts upon the small end opening when portions 31 and 32 are so engaged.

Referring again to FIG. 1, the small end support assembly is operative with a seat 42 which is or may be conventionally suited for mounting a coil spring. In the example, seat 42 conforms to the profile of, and projects into, end 14. Seat 42 may be formed by appropriate supporting structure on the sprung or unsprung mass, as the case may be. A threaded stud 44 projects through hole 40, opposite to the directions of inclination of portions 30 and 32, a sufficient distance that it is insertable into and through a hole formed in seat 42. A flanged nut 46 is threaded into the outer end of stud 44 from beneath seat 42 so that, when tightened, stud 44 is drawn down upon and hence pulls portion 34 portion toward and into face-to-face contact with seat 42. Consequently, portions 30 and 32 apply pressure to the generally conical interior surface of end 14, so as to draw end 14 upon, and secure it to, seat 42.

To facilitate installation, stud 44 may be secured to portion 34 so that the distal end of stud 44 can be grasped in order to insert member 28 sideways through the opening in end 14. Once inserted, while still so grasping stud 44, member 28 is turned so that it is adjacent and generally parallel to the opening, with stud 44 projecting outwardly through it. The distal end of stud 44 thereupon can be released and then inserted through the hole in seat 42, whereupon it may be secured by nut 46, as described above.

Figure 2:
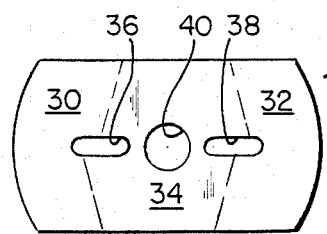
FIG. 2 is a top plan view of the retaining member of the small end support assembly of the FIG. 1 mounting apparatus.

Referring in particular to FIG. 2, member 28 includes two elongated slots 36 and 38, which are separated by a central bolt hole 40. In the example, these slots are formed with their longitudinal edges perpendicular to the undersurface of portions 30, 32, and 34, and are in parallel alignment with the diameter of hole 40, taken along the longitudinal center line of member 28. As pressure is applied to the underlying generally conical interior surface of end 14, as just described, each of these slots causes the surface to bulge outwardly into them, thereby forming two spaced apart shoulders which abut against their longitudinal edges. So long as this pressure is maintained, these shoulders block member 28 from shifting rotatively about hole 40 with respect to the underlying surface of body 10.

Figure 3:
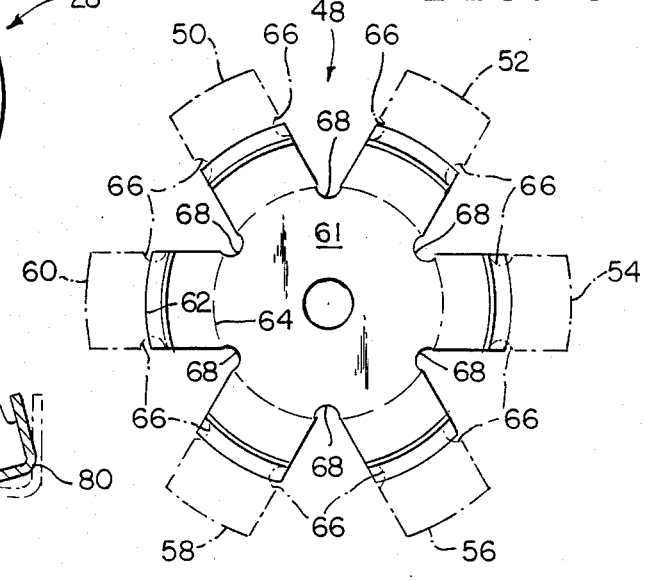
FIG. 3 is a top plan view of the retaining member of the large end support assembly of the FIG. 1 mounting apparatus, depicting its flat pattern in broken lines.
Figure 4:
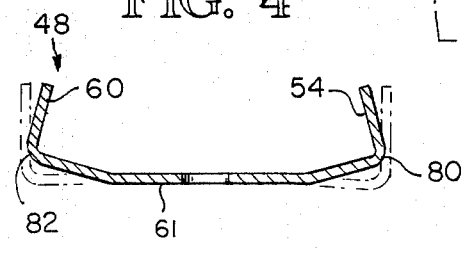
FIG. 4 is a side elevation of the FIG. 3 retaining member, depicting the position of its flanges after being bent during installation in broken lines.

Referring now to FIGS. 1, 3 and 4, the large end support assembly is made up of a retaining member 48 which, in the example, has six radial flange arms which terminate in upstanding flange portions 50, 52, 54, 56, 58, and 60. These are engagable, respectively, in face-to-face relation with spaced apart portions of the generally cylindrical interior surface of end 16. Member 48 further includes an intermediate portion 61 which fronts upon the opening in end 16 when portions 50, 52, 54, 56, 58, and 60 are so engaged.

Referring in particular to FIGS. 3 and 4, member 48 is pre-stressed, so that it is bendable about circular deformation lines 62 and 64. Line 62 intersects all of the flange arms at the bases of portions 50, 52, 54, 56, 58 and 60, as shown (FIG. 3). Line 64 likewise intersects these arms where they join portion 61. Opposed pairs of semicircular cut-outs 66 weaken portions 50, 52, 54, 56, 58 and 60 to facilitate bending of them along the intervening portion of line 62. Generally similar cut-outs 68 weaken the bases of the flange arms and likewise facilitate further bending. The purpose and effect of this bending action will be described presently.

Referring again to FIG. 1, the large end support assembly is operative with a seat 70 which, in the example, forms a flat surface 72, so disposed that it is located inside end 16 when the spring is positioned beneath seat 70, as shown (FIG. 1). Seat 70 may be formed by appropriate supporting structure on the sprung or unsprung mass, as the case may be. A bolt 74 extends through a washer 74 through a hole in surface 72. A flanged nut 78 is threaded onto the outer end of bolt 74 from beneath surface 72 so that, when tightened, bolt 74 is drawn down upon and hence pulls portion 61 toward and into face-to-face contact with surface 72.

Referring in particular to FIGS. 1 and 4, the flange arms preferably are of lengths sufficient that the bases of their flange portions (only portions 60 and 54 shown) firmly contact the generally cylindrical interior surface of end 16 when member 48 is first inserted into end 16, in the position illustrated in FIG. 1. (Such points of contact of portions 54 and 60 are referred to by numerals 80 and 82 in FIG. 4). The contact pressure obtained should be sufficient that the flange arms do not tend to shift axially along this surface when member 48 is pulled toward seat 70. Consequently, as portion 61 is pulled against surface 72, as described above, the flange portions bend simultaneously about these points of contact. To a lesser degree, the flange arms bend conjointly. The flange portions thus spread outwardly, as depicted by broken lines in FIG. 4, so as to expand into and positively engage body 10. The more pulling forces applied to portion 61, the more tightly the flange portions engage the generally cylindrical interior surface of end 16 until attaining the fully expanded position illustrated in FIG. 1. Consequently, as the flange portions so engage it, member 48 draws end 16 upon, and secures it to seat 70.

To install the spring illustrated in the drawings, end 16 is secured first by the large end support assembly just described. As will be appreciated, this assembly does not require that end 14 be secured in order to obtain the desired effect. Once this is accomplished, end 14 is secured as described above. Unlike the large end support assembly, the small end support assembly requires that end 16 already be and remain secured during the insertion and bolting down of member 28 as described above.

As will now be recognized, an important requirement of the present invention, when used with the mounting apparatus just described, is that it possesses sufficient end reinforcement that the internal pressure applied to it by the retaining members does not produce undue deformation, causing their positive securement effects to be dissipated or lost altogether. In the example, this reinforcement is provided by the end coils 18, 20 and 22; however, satisfactory reinforcement may be obtained by other means such as tire cord or other hoop-like constraint surrounding the end portions of body 10, whether or not embedded in body 10.

While one presently preferred embodiment of tee present invention has been illustrated and described herein, variations will become apparent to one of ordinary skill in the art. Accordingly, the invention is not to b limited to the specific embodiment illustrated and described herein, and the true scope and spirit of the invention are to be determined by reference to the appended claims.

The embodiments of the invention in which an exclusive property or privilege is claimed are defined as follows:

1. A composite spring mountable on a coil spring seat having a projection surrounded by a circular coil support surface using two internal support assemblies, each of which grips said spring internally, said spring comprising: a tubular elastomeric body having two ends reinforced to resist deformation by two gripping forces respectively exerted by said support assemblies, wherein one of said ends is generally cylindrical and has a diameter greater than the diameter of said coil support surface, and the other of said ends is tapered and terminates in a circular opening having a diameter corresponding to the diameter of said coil support surface such that said other end is supportable by said coil support with said projection inside said opening.

2. The spring of claim 1, wherein said other end includes coil spring means reinforcing said other end against said deformation.

3. The spring of claims 1 or 2, wherein said one end includes coil spring means reinforcing said one end against said deformation.

4. A composite spring mountable on a coil spring seat having a projection surrounded by a circular coil support surface, using an internal support assembly which grips said spring internally, said spring comprising: a tubular elastomeric body having a coil spring embedded therein; said body including a cylindrical end having a diameter greater than the diameter of said coil support surface, and a tapered end which terminates in a circular opening having a diameter corresponding to the diameter of said coil support surface, wherein said tapered end is reinforced to resist deformation by an internal gripping force exerted by said support assembly, wherein said reinforcment is provided by at least one coil of said coil spring located in said tapered end, and wherein said tapered end is supportable by said coil support surface (1) with said projection inside said opening, and (2) with said one coil interposed between said support assembly and said coil support surface.

* * * * *